US009246955B2

(12) United States Patent
Stille et al.

(10) Patent No.: US 9,246,955 B2
(45) Date of Patent: Jan. 26, 2016

(54) CAPABILITY QUERY HANDLING IN A COMMUNICATION NETWORK

(75) Inventors: Mats Stille, Bromma (SE); Håkan Österlund, Ekerö (SE); Anders Ryde, Saltsjöbaden (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 625 days.

(21) Appl. No.: 13/254,023

(22) PCT Filed: Mar. 6, 2009

(86) PCT No.: PCT/EP2009/052661

§ 371 (c)(1),
(2), (4) Date: Sep. 8, 2011

(87) PCT Pub. No.: WO2010/099829

PCT Pub. Date: Sep. 10, 2010

(65) Prior Publication Data

US 2011/0314140 A1 Dec. 22, 2011

(51) Int. Cl.
*G06F 15/173* (2006.01)
*H04L 29/06* (2006.01)

(52) U.S. Cl.
CPC ............ *H04L 65/1069* (2013.01); *H04L 69/24* (2013.01)

(58) Field of Classification Search
CPC . H04L 63/08; H04L 65/1016; H04L 65/1006; H04W 4/08; H04M 2203/2044
USPC .................................................. 709/206, 223
See application file for complete search history.

(56) References Cited

U.S. PATENT DOCUMENTS 6,954,654 B2 * 10/2005 Ejzak ............................ 455/560
6,985,961 B1 * 1/2006 Ramsayer et al. ............ 709/238
7,629,882 B2 * 12/2009 Farah et al. .............. 340/539.13
7,701,969 B2 * 4/2010 Carrigan et al. .............. 370/466
7,870,196 B2 * 1/2011 Costa Requena ............ 709/206
7,984,130 B2 * 7/2011 Bogineni et al. .............. 709/223
(Continued)

FOREIGN PATENT DOCUMENTS

CN 101355797 A 1/2009

OTHER PUBLICATIONS

Rosenberg, J. et al. "Indicating User Agent Capabilities in the Session Initiation Protocol (SIP)." IEFT Network Working Group, Request for Comments: 3840, Category: Standards Track, Aug. 2004.

*Primary Examiner* — Kevin Bates
*Assistant Examiner* — Clarence McCray
(74) *Attorney, Agent, or Firm* — Coats & Bennett, PLLC

(57) ABSTRACT

A method and apparatus for handling a Session Initiation Protocol (SIP) OPTIONS capability query message in a communication network. A SIP proxy node receives a SIP OPTIONS message from a querying node. It sends the message to a plurality of devices, and receives a response from at least two of the plurality of devices. Each response includes an identity of the responding device and an indication of the capabilities of the responding device. Each received response is stored in a memory, and a reply message is generated. The reply message includes the identities and capabilities of all of the responding devices. This reply message is then sent to the querying node. This allows the querying node to receive capability information relating to all of the callee's devices rather than just the one that responds first.

12 Claims, 3 Drawing Sheets

(56) References Cited

U.S. PATENT DOCUMENTS

| | | | | |
|---|---|---|---|---|
| 8,010,642 | B2 * | 8/2011 | Gonzalez Lopez et al. | 709/223 |
| 8,295,207 | B2 * | 10/2012 | Stille et al. | 370/261 |
| 8,499,082 | B2 * | 7/2013 | Roach et al. | 709/227 |
| 8,787,267 | B2 * | 7/2014 | Levenshteyn et al. | 370/329 |
| 2003/0236892 | A1 * | 12/2003 | Coulombe | 709/228 |
| 2006/0078096 | A1 * | 4/2006 | Poyhonen et al. | 379/88.12 |
| 2007/0106795 | A1 * | 5/2007 | Gilfix et al. | 709/226 |
| 2007/0204015 | A1 * | 8/2007 | Gonzalez Lopez et al. | 709/223 |
| 2007/0274301 | A1 * | 11/2007 | Mutikainen | 370/357 |
| 2008/0045203 | A1 * | 2/2008 | Nordin et al. | 455/422.1 |
| 2008/0062997 | A1 * | 3/2008 | Nix | 370/395.2 |
| 2008/0133729 | A1 * | 6/2008 | Fridman et al. | 709/223 |
| 2008/0279119 | A1 | 11/2008 | Stille et al. | |
| 2009/0113077 | A1 * | 4/2009 | Dahlen | 709/250 |
| 2010/0061316 | A1 * | 3/2010 | Levenshteyn et al. | 370/329 |
| 2010/0088371 | A1 | 4/2010 | Xu et al. | |
| 2010/0110978 | A1 * | 5/2010 | Falkena et al. | 370/328 |
| 2010/0135199 | A1 * | 6/2010 | Nordin et al. | 370/328 |
| 2010/0299442 | A1 * | 11/2010 | van Elburg | 709/229 |
| 2011/0119340 | A1 * | 5/2011 | Van Elburg et al. | 709/206 |
| 2011/0164537 | A1 * | 7/2011 | Cai et al. | 370/259 |
| 2014/0226654 | A1 * | 8/2014 | Agrawal et al. | 370/352 |
| 2014/0297438 | A1 * | 10/2014 | Dua | 705/21 |

* cited by examiner

CAPABILITY QUERY HANDLING IN A COMMUNICATION NETWORK

TECHNICAL FIELD

The invention relates to the field of handling a capability query message such as a Session Initiation Protocol OPTIONS message in a communication network.

BACKGROUND

The use of Session Initiation Protocol (SIP) signalling is widespread in a variety of communications systems and architectures. One example is the IP Multimedia Subsystem (IMS) architecture developed under the Third Generation Project Partnership (3GPP) to provide IP Multimedia services over mobile communication networks. IP Multimedia services provide a dynamic combination of voice, video, messaging, data, etc. within the same session.

The IMS uses Session Initiation Protocol (SIP) to set up and control calls or sessions between user terminals (or user terminals and application servers). The Session Initiation Protocol is a text-based protocol specified by the Internet Engineering Task Force (IETF) in RFC 3261, similar to Hypertext Transfer Protocol (HTTP) and Simple Mail Transfer Protocol (SMTP), for initiating interactive communication sessions between users. Such sessions include voice, video, chat, interactive games, and virtual reality. Extensions to SIP are also specified in several other IETF specifications.

SIP makes it possible for a calling party to establish a packet switched session to a called party (using so-called SIP User Agents (UA) installed in the User Equipment (UE)) even though the calling party does not know the current IP address of the called party prior to initiating the call. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1*a* control of communications occurs at three layers (or planes). The lowest layer is the Connectivity Layer 1, also referred to as the bearer plane and through which signals are directed to/from user equipment, UE, accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2 acts as an interface between the GPRS backbone network and other networks (radio network and the IMS network). The middle layer is the Control Layer 4, and at the top is the Application Layer 6.

The IMS 3 includes a core network 3*a*, which operates over the middle, Control Layer 4 and the Connectivity Layer 1, and a Service Network 3*b*. The IMS core network 3*a* includes nodes that send/receive signals to/from the GPRS network via the GGSN 2*a* at the Connectivity Layer 1 and network nodes that include Call/Session Control Functions (CSCFs) 5, which operate as SIP proxies within the IMS in the middle, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3*b*. Application Servers (ASs) 7 are provided for implementing IMS service functionality.

A SIP proxy, such as a CSCF, is defined in RFC 3261 as an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (for example, making sure a user is allowed to make a call). A proxy interprets, and, if necessary, rewrites specific parts of a request message before forwarding it."

RFC 3261 describes an OPTIONS method that can be used to query the capabilities of another party such as another user device or a proxy server. This allows a SIP client to discover information about the supported capabilities, methods, content types, extensions, codecs etc. of the other party. This can be done without "ringing" the other party. The response, containing details of the supported capabilities, is returned in a SIP 200 OK message.

It is becoming more common for a user to have access to a network using one (or more) of a variety of devices. For example, Bob might connect to an IMS network (or other network that uses SIP) using any of a mobile device, a personal computer, a fixed line telephone and a set top box. When Alice wishes to 'ping' Bob to ascertain his device capabilities, by sending a SIP OPTIONS message, the SIP OPTIONS is sent to each of Bob's devices. When Alice receives a SIP 200 OK message from the device that is quickest to respond, the capabilities contained in the SIP 200 OK message are the capabilities that Alice registers. Subsequent SIP 200 OK messages that are received from Bob's other devices are discarded.

A problem with the signalling described above is that the response to the querying party (Alice) only reflects the capabilities of the device that is fastest to respond. The capabilities of Bob's other devices will not be known to Alice, as the subsequently received SIP 200 OK responses are discarded. Alice therefore does not have a complete knowledge of the capabilities of Bob's various devices. If, for example, Bob owns an audio device and a messaging device, and the audio-device is the fastest to respond to the SIP OPTIONS message, Alice's device will believe that Bob's device is capable of audio only, when in fact Bob also has a registered device that is capable of messaging. Alice might therefore choose not send Bob a messaging communication.

SUMMARY

It is an object of the invention to overcome the limitations described above and to improve the information provided to a querying node that sends a Session Initiation Protocol OPTIONS message to obtain capability information.

According to a first aspect of the present invention, there is provided a method of handling a Session Initiation Protocol (SIP) OPTIONS capability query message in a communication network. A Session Initiation Protocol proxy node receives a SIP OPTIONS message from a querying node. It sends the message to a plurality of devices, and receives a response from at least two of the plurality of devices. Each response includes an identity of the responding device and an indication of the capabilities of the responding device. Each received response is stored in a memory, and a reply message is generated. The reply message includes the identities and capabilities of all of the responding devices. This reply message is then sent to the querying node. This allows the querying node to receive capability information relating to all of the callee's devices rather than just the one that responds first.

The capabilities are optionally selected from any of a service capability, a codec and a media capability, although any type of capability information specific to the devices can be included.

The method optionally comprises, at the querying device, receiving the reply message. The querying device can obtain the identities and capabilities of the responding devices from the reply message. As a further option, querying device may display to a user the capabilities of the responding devices.

It is preferred that the identities of each responding device are mapped to the capabilities to the capabilities of that responding device, and the mapped information is included in the reply message. This allows the querying device to know which responding devices have which capabilities, so that the querying node can present to its user which combination of features will be successful in a single communication service request towards the queried party. For example, if the queried party has an audio phone device with audio capabilities and a video web camera device with video, the querying device is given information about which device has which capabilities. It can therefore present options for the querying user to make either a single request for audio communication or a one-way video communication, but not both.

The communication network is optionally an IP Multimedia Subsystem network, although the method may be used in any type of communication network that allows SIP communications.

According to a second aspect of the invention, there is provided a SIP proxy node. The SIP proxy node is provided with a first receiving function for receiving a SIP OPTIONS message from a querying node. A first transmitting function is provided for sending the message to a plurality of devices. A second receiving function is provided for receiving from at least two of the plurality of devices a response. Each response includes an identity of the responding device and an indication of the capabilities of the responding device. A memory is provided for storing each received response, and a processing function is provided for generating a reply message, the reply message including the identities and capabilities of all of the responding devices. A second transmitting function is provided for sending the reply message to the querying node.

As an option, the processing function is further arranged to include mapping information in the generated reply message, the mapping information identifying which capabilities correspond to a responding device. This allows the querying node to identify the most appropriate device with which to communicate.

As an option, the SIP proxy node is selected from any of a Serving-Call Session Control Function, an Interrogating-Call Session Control Function and a Proxy-Call Session Control Function.

According to a third aspect of the invention, there is provided a node for use in a communication network that uses the Session Initiation Protocol. The querying node comprising a transmitter for sending a SIP OPTIONS message to a SIP proxy node. A receiver is provided for receiving from the SIP proxy node a reply message, the reply message including the identities and capabilities of a plurality of nodes. A processor is provided for obtaining the identities and capabilities of the plurality of nodes from the reply message As an option, the node further comprises a display device for displaying to a user the received capabilities of the plurality of nodes.

According to a third aspect of the invention, there is provided a computer program, comprising computer readable code which, when run on an apparatus, causes the apparatus to perform a method as described above in the first aspect of the invention.

According to a fourth aspect of the invention, there is provided a computer program product comprising a computer readable medium and a computer program according to the third aspect of the invention described above, wherein the computer program is stored on the computer readable medium.

DETAILED DESCRIPTION

Figure 1:
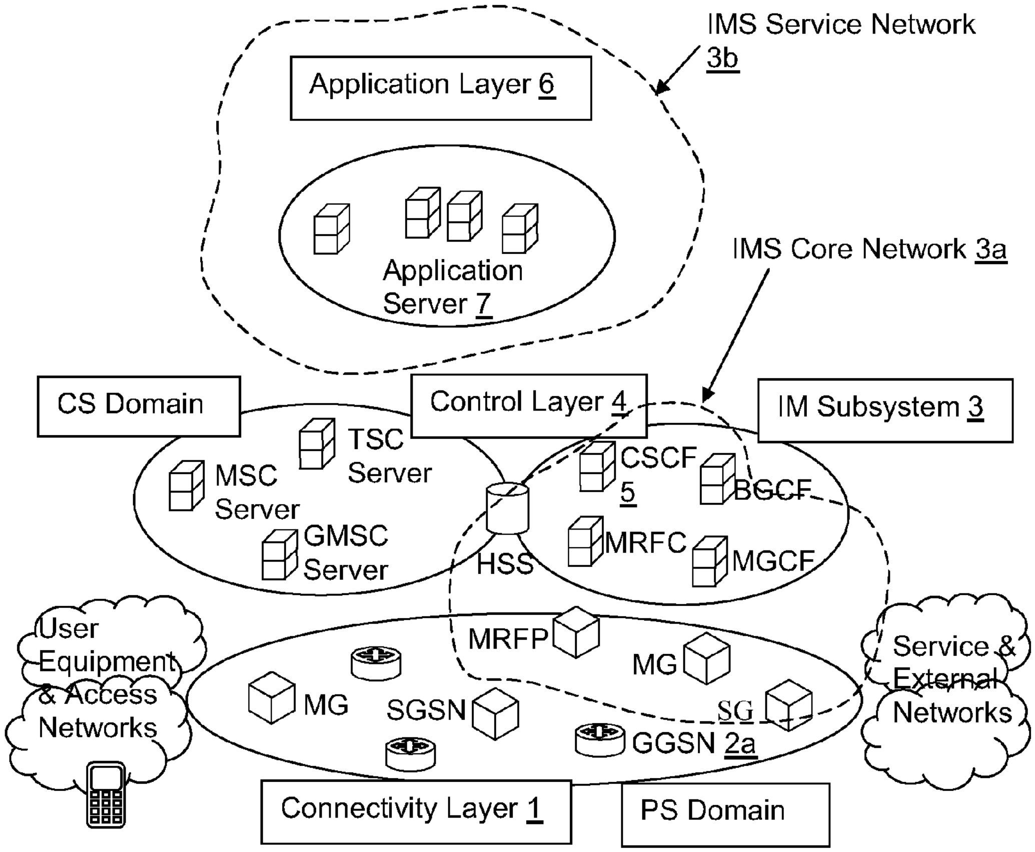
FIG. 1 illustrates schematically in a block diagram an IMS network in association with a mobile network architecture of a General Packet Radio Service (GPRS) access network.
Figure 2:
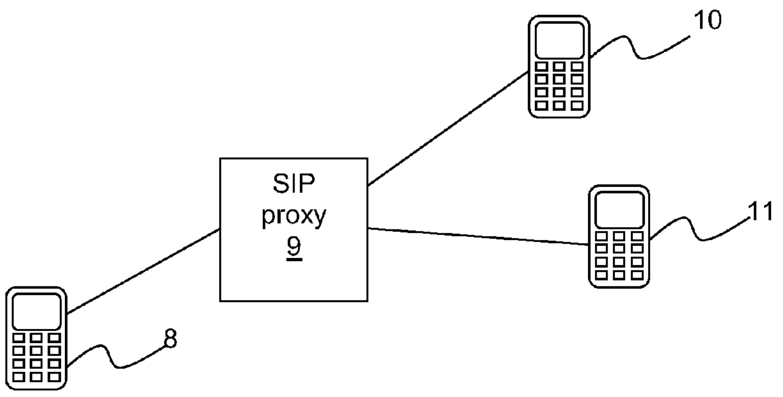
FIG. 2 illustrates schematically in a block diagram a network architecture according to an embodiment of the invention.

Referring to the example network in FIG. 2, Alice 8 communicates with Bob via Bob's SIP proxy server 9. In this example, Bob has two devices, a Push-to-talk (PTT) device 10 and a chat device 11. Each of Bob's devices has performed a successful registration process and so are available in the network.

A storage function and an aggregation function are provided in the SIP proxy server 9. The SIP proxy server 9 is responsible for sending out the SIP OPTIONS message to each of Bob's devices 10, 11. The storage function receives the responses (SIP 200 OKs) from Bob's devices 10, 11 and stores them. The aggregation function concatenates identification and capability information obtained from the responses into a single response, which is then sent to Alice 8. The proxy server 9 may include an instruction body in single response message sent to Alice 8 which describes how the query result callee capabilities are divided over several callee contacts. This is important to ensure that Alice knows which of Bob's devices 10, 11 have which capabilities. For example, Bob's device 10 may be a Set Top Box which has capabilities relating to codecs, but not SMS messaging, whereas Bob's device 11 may be User Equipment that has capabilities relating to SMS messaging but not handling the same media codecs as the Set Top Box 10. It is important for Alice 8 to know which device to send any messages to if she requires specific capabilities of Bob's device.

Figure 3:
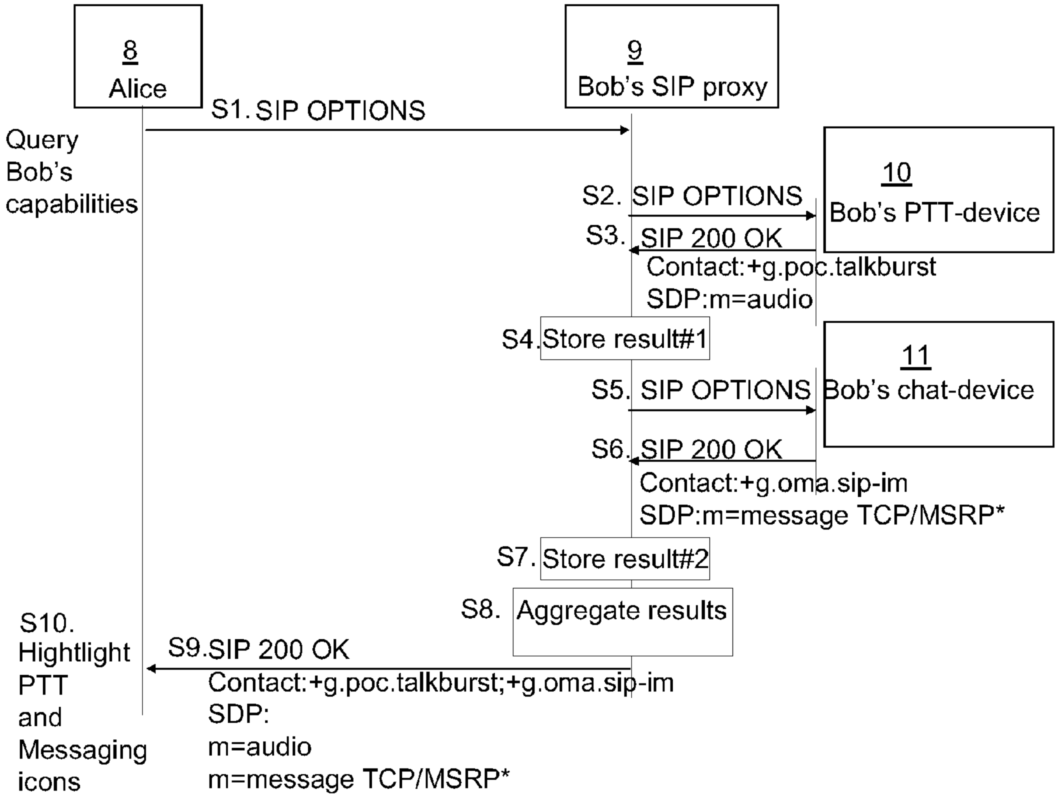
FIG. 3 is a signalling diagram illustrating signalling according to an embodiment of the invention.

There now follows an example signalling flow for the situation illustrated in FIG. 2. The following numbering corresponds to the numbering in FIG. 3:

S1. Alice 8 sends a SIP OPTIONS message to Bob's SIP proxy 9 in order to query the capabilities of Bob's devices 10, 11.

S2. The SIP proxy 9 sends the SIP OPTIONS message to Bob's PTT device 10.

S3. Bob's PTT device 10 responds to the SIP proxy 9 with a SIP 200 OK message that includes information identifying the device 10 and describing its PTT-service capability and an audio media capability.

S4. The storage function stores this information and awaits further responses from other devices.

S5. The SIP proxy 9 sends the SIP OPTIONS message to Bob's chat device 11.

S6. Bob's chat device 11 responds to the SIP proxy 9 with a SIP 200 OK message that includes information identifying the device 11 and describing its OMA Instant Messaging (IM) capability and TCP based MSRP transfer media capability.

S7. The storage function stores this information and if necessary awaits further responses from other devices.

Note that whilst steps S2 to S7 are described and illustrated as occurring consecutively, steps S2 and S5 in practice are more likely to be sent at substantially the same time. Furthermore, the skilled person will appreciate that the same principles apply regardless of the number of devices Bob has registered.

S8. Once all outstanding positive responses have been received by the proxy server 9, the aggregation function concatenates the service capabilities and the media capabilities from all responses into a single SIP 200 OK response. The aggregation function sets all service capabilities (push-to-talk and OMA IM, above) in the contact header. The media capabilities (audio and MSRP, above) are set in media attributes of the SDP body. Other information that may be set in the SIP 200 OK are port0 set in the media-line, and codec attributes may also be included.

S9. The SIP 200 OK response containing the concatenated information is sent from the SIP proxy 9 to Alice 8.

S10. When the single SIP 200 OK response is received at Alice's querying device 8, the device obtains the concatenated information from the SIP 200 OK and hence has knowledge of Bob's push-to-talk and OMA messaging services. If those services are understood by the querying device, then Alice can be made aware of these services, for example by highlighting or displaying icons that illustrate those services. Furthermore, Alice's querying device may display which of Bob's devices have which capabilities, so that Alice knows which of Bob's devices is the most appropriate device to communicate with.

Figure 4:
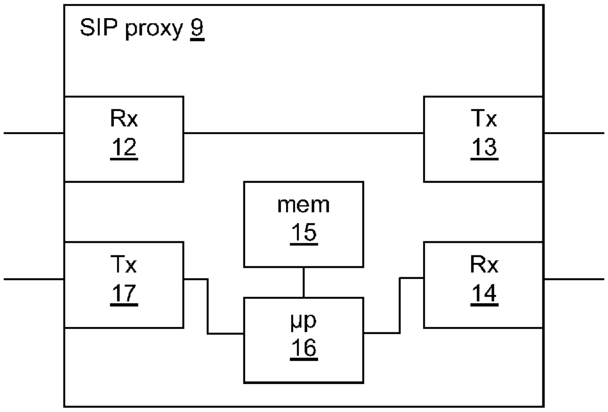
FIG. 4 illustrates schematically in a block diagram a SIP proxy node according to an embodiment of the invention.

Referring to FIG. 4, there is illustrated a SIP proxy 9 according to an embodiment of the invention. The SIP proxy 9 may be any sort of SIP proxy, for example a Serving-Call Session Control Function, an Interrogating-Call Session Control Function or a Proxy-Call Session Control Function. The SIP proxy 9 is provided with a first receiving function 12 for receiving the SIP OPTIONS message from Alice 8. A first transmitting function 13 is also provided for sending the message to Bob's devices 10, 11. A second receiving function 14 is arranged to receive responses from at least two of Bob's devices. As described above, each response includes an identity of the responding device and an indication of the capabilities of the responding device. A memory 15 is used to store each received response, and a processing function 16 is provided for generating a SIP 200 OK message to send to Alice, the SIP 200 OK message including the identities and capabilities of all of the responding devices. The SIP 200 OK message may also include information identifying which of Bob's devices have the identified capabilities. A second transmitting function 17 is provided for sending the reply message to the querying node. Note that whilst the above description refers to first and second transmitting functions and receiving functions, these functions may be embodied in on or a plurality of transmitters, receivers and transceivers.

Figure 5:
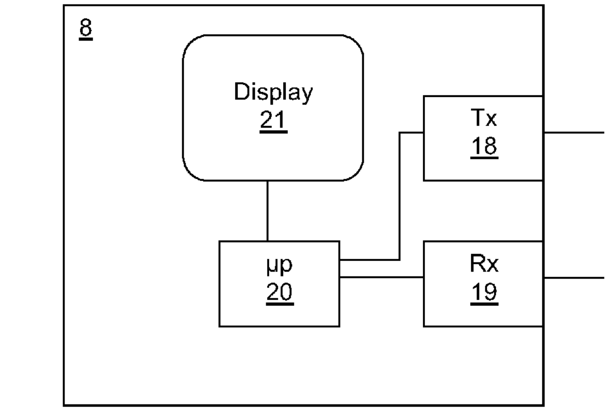
FIG. 5 illustrates schematically in a block diagram a querying node according to an embodiment of the invention.

Referring to FIG. 5, there is illustrated a querying node 8, described above as Alice's device. Alice's device is provided with a transmitter 18 for sending a SIP OPTIONS message to the SIP proxy 9. A receiver 19 is provided for receiving a SIP 200 OK from the SIP proxy 9. The SIP 200 OK includes the identities and capabilities of each of Bob's devices 10, 11. A processor 20 is provided for obtaining from the reply message the identities and capabilities of each Bob's devices 10, 11. A display device 21 may be provided for displaying to Alice the received capabilities of Bob's devices 10, 11.

The invention provides for a more informative handling of capability queries. This may be of use to operators who plan to launch an IMS system in which end-users can be reached using a single address providing a multitude of services spread over a multitude of devices.

It will be appreciated by a person of skill in the art that various modifications may be made to the embodiments described above without departing from the scope of the present invention as defined by the claims.

The invention claimed is:

1. A method of handling a Session Initiation Protocol OPTIONS capability query message in a communication network, the method comprising:

at a Session Initiation Protocol proxy node, receiving a Session Initiation Protocol OPTIONS message from a querying node, the Session Initiation Protocol OPTIONS message querying capabilities of a user's devices;

sending the received Session Initiation Protocol OPTIONS message to a plurality of devices, each device of the plurality of devices being registered in the communication network to the user;

receiving from at least two of the plurality of devices a response, each response including an identity of the responding device and an indication of the capabilities of the responding device;

storing each received response in a memory;

generating a reply message, the reply message including the identities and capabilities of all of the responding devices; and sending the reply message to the querying node.

2. The method according to claim 1, wherein the capabilities comprise at least one of a service capability, a codec, and a media capability.

3. The method according to claim 1, further comprising:

mapping, at the Session Initiation Protocol proxy node, the identities of each responding device to the capabilities of that responding device, and including the mapped identities in the reply message.

4. The method according to claim 1, wherein the communication network comprises an IP Multimedia Subsystem network.

5. A method of handling a Session Initiation Protocol OPTIONS capability query message in a communication network, the method comprising:

from a querying device, sending a Session Initiation Protocol OPTIONS message to a proxy node, the Session Initiation Protocol OPTIONS message querying capabilities of a user's devices;

at the querying device, receiving a reply message, said reply message including identities and capabilities of at least two responding devices, each of the responding devices being registered in the communication network to the user; and obtaining the identities and capabilities of the responding devices from the reply message.

6. The method according to claim 5, further comprising, at the querying device, displaying to a user the capabilities of the responding devices.

7. A Session Initiation Protocol proxy node comprising:

a first receiving function configured to receive a Session Initiation Protocol OPTIONS message from a querying node, the Session Initiation Protocol OPTIONS message querying capabilities of a user's devices;

a first transmitting function configured to send the message to a plurality of devices, each device of the plurality of devices being registered in the communication network to the user;

a second receiving function configured to receive from at least two of the plurality of devices a response, each response including an identity of the responding device and an indication of the capabilities of the responding device;

a memory for storing each received response;

a processing function configured to generate a reply message, the reply message including the identities and capabilities of all of the responding devices; and a second transmitting function configured to send the reply message to the querying node.

8. The Session Initiation Protocol proxy node according to claim 7, wherein the processing function is further configured to include mapping information in the generated reply message, the mapping information identifying which capabilities correspond to a responding device.

9. The Session Initiation Protocol proxy node according to claim 7, wherein the Session Initiation Protocol proxy node comprises any of a Serving-Call Session Control Function, an Interrogating-Call Session Control Function, and a Proxy-Call Session Control Function.

10. A querying node for use in a communication network that uses Session Initiation Protocol, the querying node comprising:

a transmitter configured to send a Session Initiation Protocol OPTIONS message to a Session Initiation Protocol proxy node, the Session Initiation Protocol OPTIONS message querying capabilities of a user's devices;

a receiver configured to receive from the Session Initiation Protocol proxy node a reply message, the reply message including identities and capabilities of a plurality of devices, each of the plurality of devices being registered in the communication network to the user; and a processor configured to obtain from the reply message the identities and capabilities of a plurality of devices.

11. The querying node according to claim 10, further comprising:

a display device configured to display to a user of the node the capabilities of the plurality of devices.

12. A computer program product stored in a non-transitory computer-readable medium for controlling a Session Initiation Protocol (SIP) proxy node, the computer program and comprising software instructions that when executed by the SIP proxy node cause said SIP proxy node to:

receive a Session Initiation Protocol OPTIONS message from a querying node, the Session Initiation Protocol OPTIONS message querying capabilities of a user's devices;

send the message to a plurality of devices, each device of the plurality of devices being registered in the communication network to the user;

receive from at least two of the plurality of devices a response, each response including an identity of the responding device and an indication of the capabilities of the responding device;

store each received response in a memory;

generate a reply message, the reply message including the identities and capabilities of all of the responding devices; and send the reply message to the querying node.

* * * * *